(12) United States Patent
Koller et al.

(10) Patent No.: US 8,412,167 B1
(45) Date of Patent: Apr. 2, 2013

(54) WIRELESS COMMUNICATION SYSTEM THAT SELECTS AND BROADCASTS FM MEDIA STREAMS ON A PER-BASE STATION BASIS

(75) Inventors: Gary Duane Koller, Overland Park, KS (US); Mark Douglas Peden, Olathe, KS (US); Simon Youngs, Overland Park, KS (US); Raymond Emilio Reeves, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/314,956

(22) Filed: Dec. 8, 2011

(51) Int. Cl.
*H04M 3/42* (2006.01)
(52) U.S. Cl. ............. 455/414.2; 455/575.1; 370/294
(58) Field of Classification Search .......... 455/414.2, 455/422.1, 185.1, 575.1; 370/399, 331, 445, 370/347, 395.53, 294; 375/219, 220, 124
See application file for complete search history.

(56) References Cited

U.S. PATENT DOCUMENTS

| | | | | |
|---|---|---|---|---|
| 5,270,922 | A * | 12/1993 | Higgins | 705/37 |
| 5,917,810 | A * | 6/1999 | De Bot | 370/294 |
| 7,054,653 | B2 | 5/2006 | Jarvi et al. | |
| 7,412,205 | B2 | 8/2008 | Jarvi et al. | |
| 7,650,111 | B2 | 1/2010 | Dennisson et al. | |
| 2005/0136884 | A1 | 6/2005 | Reidelsturz et al. | |
| 2006/0030378 | A1 * | 2/2006 | Jarvi et al. | 455/575.1 |
| 2008/0129610 | A1 * | 6/2008 | Tsfati et al. | 343/702 |
| 2008/0160940 | A1 | 7/2008 | Jendbro | |
| 2008/0163049 | A1 * | 7/2008 | Krampf | 715/700 |
| 2008/0233883 | A1 | 9/2008 | Ibrahim et al. | |
| 2009/0068971 | A1 * | 3/2009 | Grigsby et al. | 455/185.1 |
| 2009/0264149 | A1 | 10/2009 | Miller et al. | |

* cited by examiner

*Primary Examiner* — Mehendra Patel

(57) ABSTRACT

A wireless communication system broadcasts using Frequency Modulation (FM) in a Very High Frequency (VHF) band. In the system, base stations exchange wireless communications with user devices including user media requests and the requested media. A control system processes the user media requests to identify media streams for individual base stations. The individual base stations wirelessly broadcast the media streams identified by the control system using FM in the VHF band. The base stations wirelessly notify the user devices of the media stream FM broadcasts.

14 Claims, 5 Drawing Sheets

WIRELESS COMMUNICATION SYSTEM THAT SELECTS AND BROADCASTS FM MEDIA STREAMS ON A PER-BASE STATION BASIS

TECHNICAL BACKGROUND

Frequency Modulation (FM) is used to broadcast radio signals in the Very High Frequency (VHF) band from 30-300 MHz. In the United States, FM radio is typically broadcast over FM channels between 88 and 108 MHz. Each FM channel has a center frequency within a guard band of 50, 100, or 200 KHz. The frequency of a given FM signal varies about its center frequency to encode the audio content being broadcast.

Some wireless telephones are equipped with an FM receiver and channel interface to effectively function as a portable FM radio. These wireless telephones can provide voice calling and play FM radio stations. Some wireless telephones are equipped with a wireless data transceiver and internet protocol interface to effectively function as a portable Internet access device. These wireless telephones can provide voice calling and download media from the Internet. If a wireless telephone provides both FM radio and Internet access, then the user may choose to either receive audio over the FM radio or download the audio over the Internet.

OVERVIEW

A wireless communication system broadcasts using Frequency Modulation (FM) in a Very High Frequency (VHF) band. In the system, base stations exchange wireless communications with user devices including user media requests and the requested media. A control system processes the user media requests to identify media streams for individual base stations. The individual base stations wirelessly broadcast the media streams identified by the control system using FM in the VHF band. The base stations wirelessly notify the user devices of the media stream FM broadcasts.

DETAILED DESCRIPTION

Figure 1:
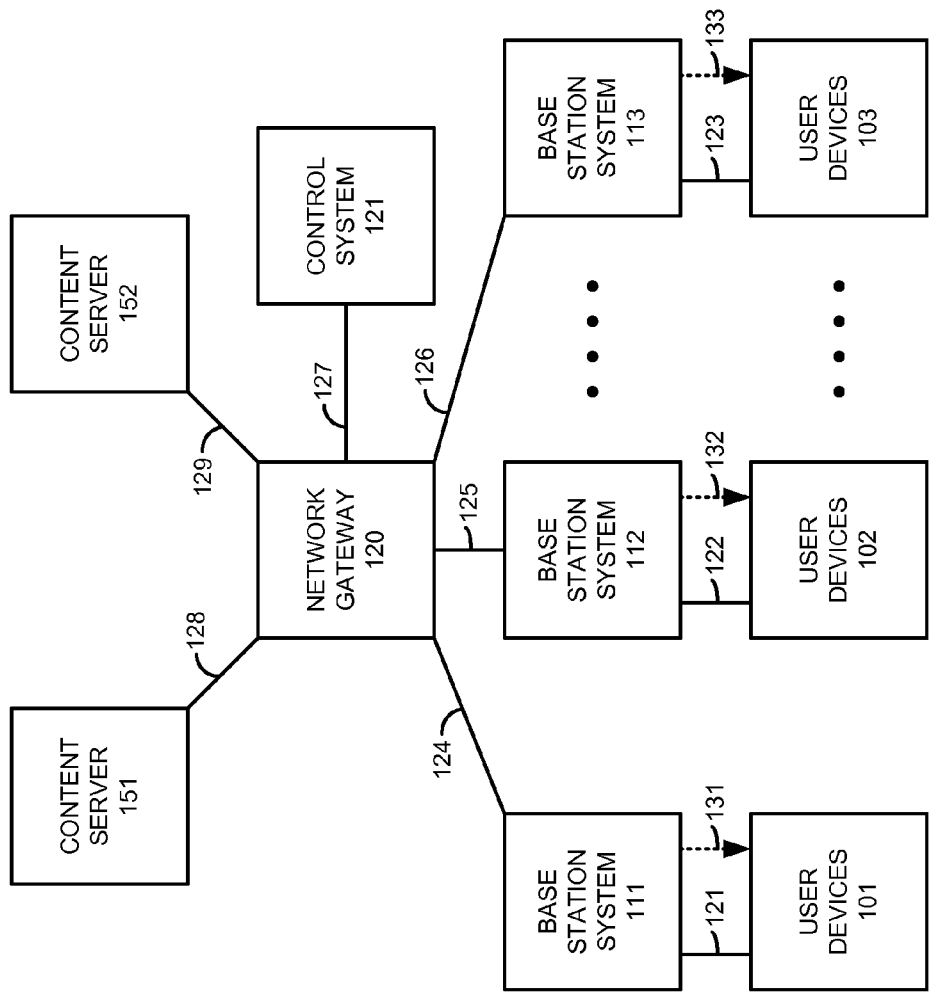
FIG. 1 illustrates a communication system to implement FM broadcasting from individual base stations.

FIG. 1 illustrates communication system 100 to implement FM broadcasting from individual base stations. Communication system 100 comprises user devices 101-103, base station systems 111-113, network gateway 120, control system 121, and content servers 151-152. User devices 101-103 could be smart-phones, tablets, computers, media players, game consoles, or some other user apparatus having wireless connectivity. Base station systems 111-113 comprise antennas, amplifiers, filters, modulators, signal micro-processors, network communication interfaces, control computers, and the like. Network gateway 120 and control system 121 comprise computer and communication equipment and could be integrated together. Content servers 151-152 comprise computer equipment to stream media over networks, such as the Internet.

User devices 101-103 and base station systems 111-113 communicate over respective wireless links 121-123. Wireless links 121-123 may use protocols like Long Term Evolution (LTE), Code Division Multiple Access (CDMA), Global System for Mobile communications (GSM), Universal Mobile Telecommunications System (UMTS), High-Speed Packet Access (HSPA), Evolution-Data Optimized (EV-DO), Worldwide Interoperability for Microwave Access (WiMAX), Wireless Fidelity (WiFi), or some other wireless communication protocol—including combinations thereof. Base station systems 111-113 and network gateway 120 communicate over respective backhaul links 124-126. Network gateway 120 and control system 121 communicate over data link 127. Network gateway 120 and content servers 150-151 communicate over network links 128-129. Links 124-129 may be wireless, wired, or optical and use various protocols, such as Time Division Multiplex (TDM), Ethernet, Internet Protocol (IP), E-band wireless, Wave Division Multiplexing (WDM), Synchronous Optical Network (SONET), or some other network protocol—including combinations thereof. Links 124-129 may be direct links, or they may be indirect links that comprise intermediate devices, systems, and networks.

Base station system 111 wirelessly broadcasts media stream 131 to user devices 101 using FM in the VHF band. Base station system 112 wirelessly broadcasts media stream 132 to user devices 102 using FM in the VHF band. Base station system 113 wirelessly broadcasts media stream 133 to user devices 103 using FM in the VHF band. Not all of the user devices 101-103 may be configured to receive the FM broadcasts and not all of the base stations 111-113 may provide the FM broadcasts all of the time.

Media streams 131-133 are individually selected for each base station based on the media requests from users of that base station. For example, media stream 131 for base station 101 is selected based on the media requests from user devices 101 that use base station 111. Likewise, media stream 132 is selected for base station 112 based on the media requests from user devices 102 that use base station 112.

Figure 2:
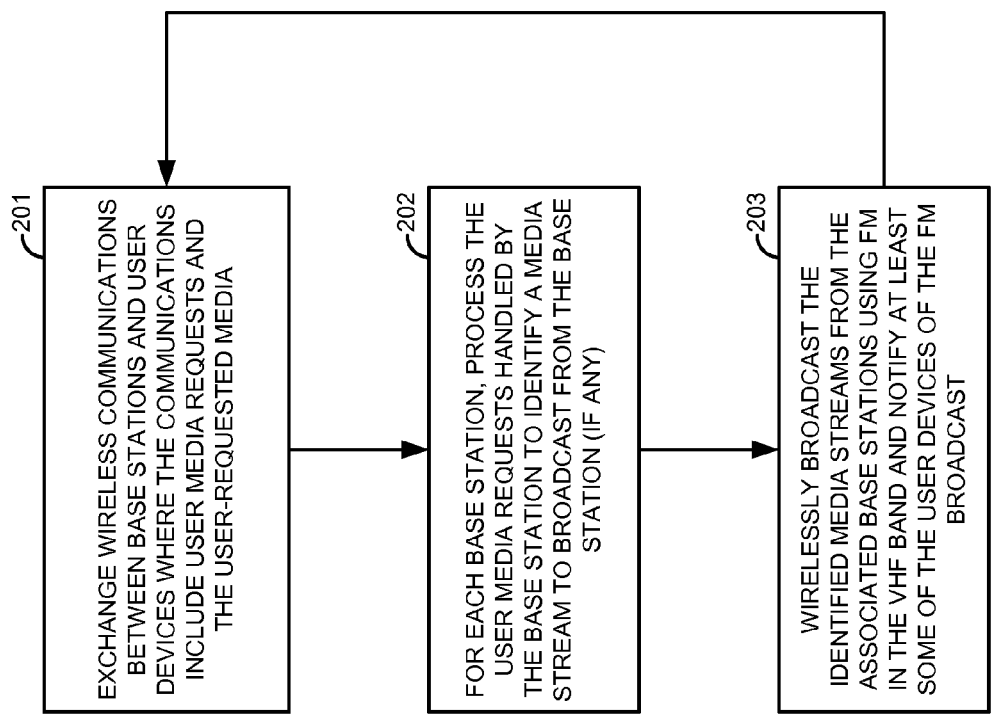
FIG. 2 illustrates the operation of a communication system to implement FM broadcasting from individual base stations.

FIG. 2 illustrates the operation of communication system 100 to implement FM broadcasting from individual base stations. Base station systems 111-113 exchange wireless communications with respective user devices 101-103 (201). The wireless communications include media requests from user devices 101-103 and the requested media from content servers 151-152. For example, one of user devices 101 may request an audio file from content server 151 and then receive a media stream of the audio from content server 151 over base station 111, network gateway 120, and links 121, 124, and 128.

For each base station system 111-113, control system 121 processes the user media requests to identify a media stream to broadcast from the base station system (202). For example, control system 121 may process a copy of the user media requests transferred by base station 111 to network gateway 120 to select media stream 131 for the FM broadcast from base station system 111. Likewise, control system 121 may process a copy of the user media requests transferred by base station 112 to network gateway 120 to select media stream 132 for the FM broadcast from base station system 112. Note that a media stream may not be selected for a base station in all cases.

Base station systems 111-113 then wirelessly broadcast their respective media streams 131-133 as identified by control system 121 using FM in the VHF band (203). Base station systems 111-113 also notify at least some of their user devices 101-103 of the FM broadcasts (203). In the above example, base station system 111 might notify the FM-enabled user devices 101 that it is broadcasting the audio file over an FM channel in the VHF band. In some examples, media streams 131-133 comprise audio for a live event. Thus, control system 121 processes the user media requests for a given base station to select live event audio for that base station to broadcast over an FM channel.

Figure 3:
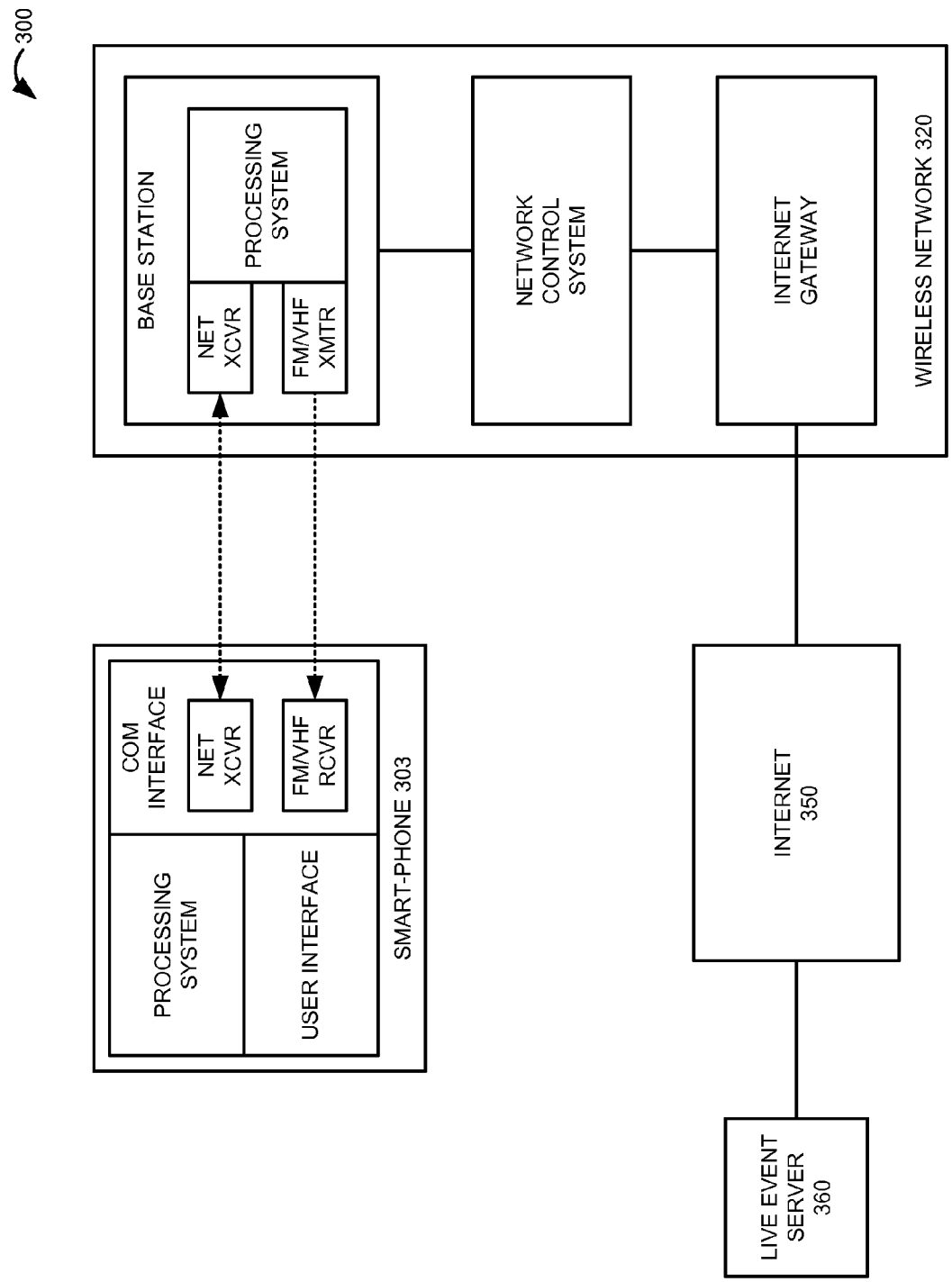
FIG. 3 illustrates a communication system to implement demand-based FM broadcasting from individual base stations.

FIG. 3 illustrates communication system 300 to implement demand-based FM broadcasting from individual base stations. Communication system 300 comprises smart-phone 303, wireless network 320, Internet 350, and live event server 360. Smart-phone 303 comprises a processing system, user interface, and communication interface. The communication interface in smart-phone 303 includes a wireless network transceiver and an FM/VHF receiver. Wireless network 320 includes a base station, network control system, and Internet gateway. The base station includes a wireless network transceiver and an FM/VHF transmitter. There are more smart-phones and base stations in system 300, but the number shown is restricted for clarity.

Figure 4:
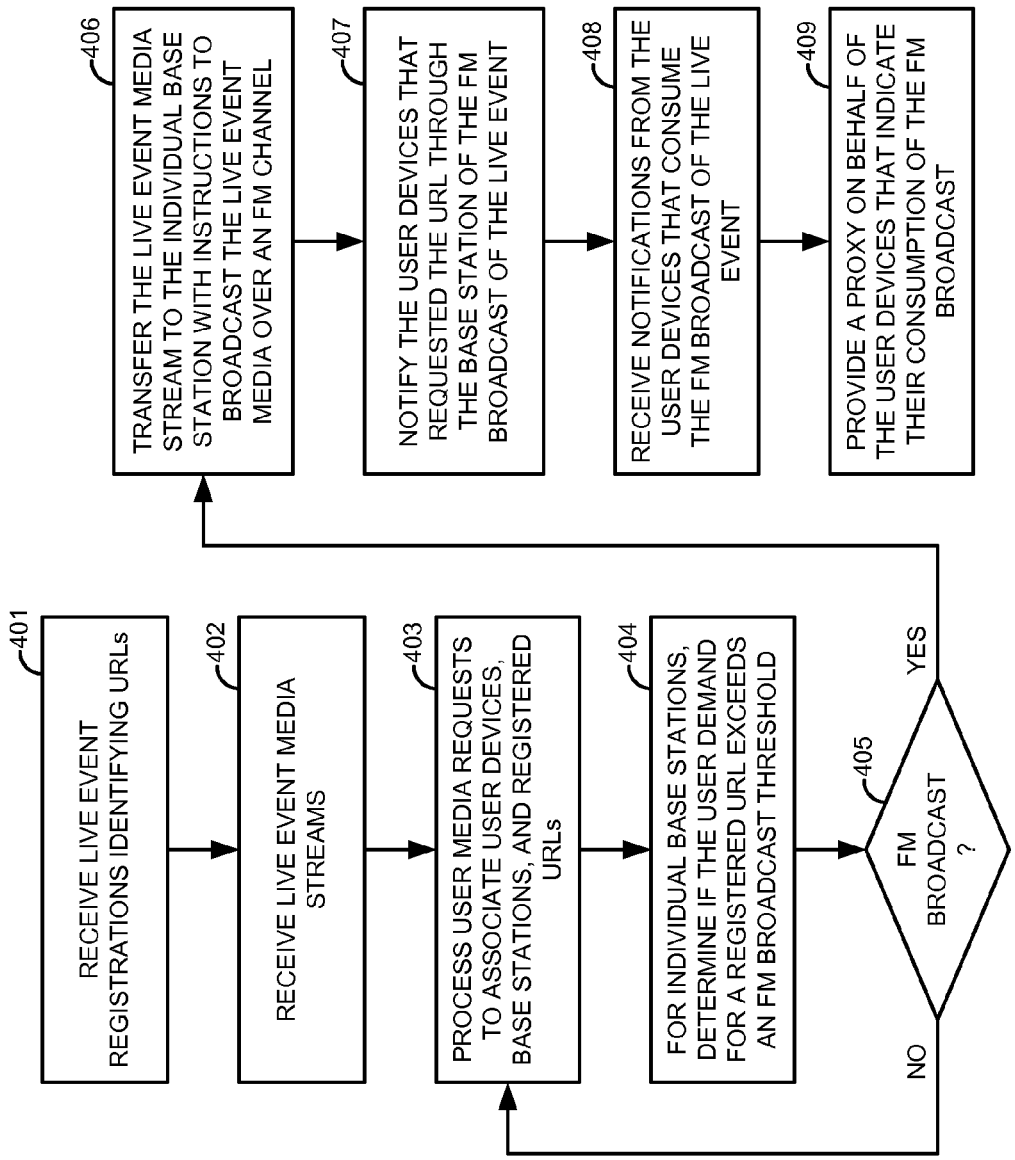
FIG. 4 illustrates the operation of a communication system to implement demand-based FM broadcasting from individual base stations.

FIG. 4 illustrates the operation of communication system 300 to implement demand-based FM broadcasting from individual base stations. The network control system receives a live event registration indicating a Uniform Resource Locator (URL) or some other media resource identifier (401). For example, live event server 360 might register the URL for live audio of a baseball game with the network control system over Internet 350. At the start of the live event, the network control system receives a media stream for the live event from live event server 360 in accord with the registration (402). Thus, the media stream for the baseball game would be received at game-time. Typically, numerous live events are registered and streamed to the network control system in this manner.

The control system processes media requests from user devices, including smart-phone 303, to associate user devices, base stations, and the registered live event URLs (203). For example, the user interface in smart-phone 300 may receive an instruction to download audio for the baseball game, and the processing system would drive the network transceiver to transmit a media request to content servers 360 that indicates the URL for the baseball game audio. The network control system would then associate smart-phone 303, the URL for the game, and the base station. This allocation process by the network control system would occur repeatedly for many other user devices, base stations, and URLs. In response to the media request with the URL, live event server 360 would stream the game audio to smart-phone 303 over the network transceivers and the wireless network connection.

The network control system determines if any base station is associated with a URL that exceeds an FM broadcast threshold (404). In this example, the media request from smart-phone 303 causes the demand for the baseball game URL to meet the threshold for the FM broadcast from the base station. If the demand for a URL exceeds the FM broadcast threshold for a base station (405), then the network control system transfers the live event media stream for the URL to that base station in accord with the prior registration of the URL (406). The network control system also instructs the base station to broadcast the live event media stream over an FM channel (406). In this example, the network control system transfers the baseball game audio to the base station with instructions to broadcast the game audio from the FM/VHF transmitter over an FM channel. Note that the base station may utilize multiple FM channels and broadcast multiple audio streams in this manner. Also note that the network control system may stream the baseball game audio over other base stations and FM channels as demand indicates.

The network control system notifies the user devices that have requested the URL through the base station of the FM broadcast (407). For example, the network control system might send an SMS message to smart-phone 303 over the network transceivers and wireless network connection indicating the FM broadcast of the baseball game. The network control system could notify other user devices as well.

In response the FM broadcast notification, the user devices tune into the FM broadcast and notify the network control system that they are consuming the FM broadcast (408). In this example, smart-phone 303 might transfer an SMS message to the network control system indicating that it is using the FM broadcast. Smart-phone 303 might stop the original game audio stream through a natural time-out or an express message.

In response to the FM broadcast consumption notification, the network control system provides a proxy to live event server 360 on behalf of the user devices that consume the FM broadcast (409). For example, the network control system might transfer consumption messages to live event server 360 on behalf of smart-phone 303 as long as smart-phone 303 provides its own FM broadcast consumption notices to the control system. The proxy notice may drive live event server 360 to stop the original media stream to the user device.

The proxy notice may also enable the user device to conveniently re-start the original media stream if the device no longer uses the FM broadcast. For example, smart-phone 303 might transfer a notice to the network control system that it will no longer consume the FM broadcast, and in response, the network control system would notify live event server 360 to re-start the original media stream to smart-phone 303 over the wireless network connection (or to provide smart-phone 303 with an expedited registration).

For example, the user of smart-phone 303 might travel and the FM broadcast signal from the base station would fade. In response to the fading FM signal, smart-phone 303 might transfer a message to the network control system that it will no longer use the FM broadcast. The network control system could then instruct live event server 360 to restore the original media stream over the wireless network.

Figure 5:
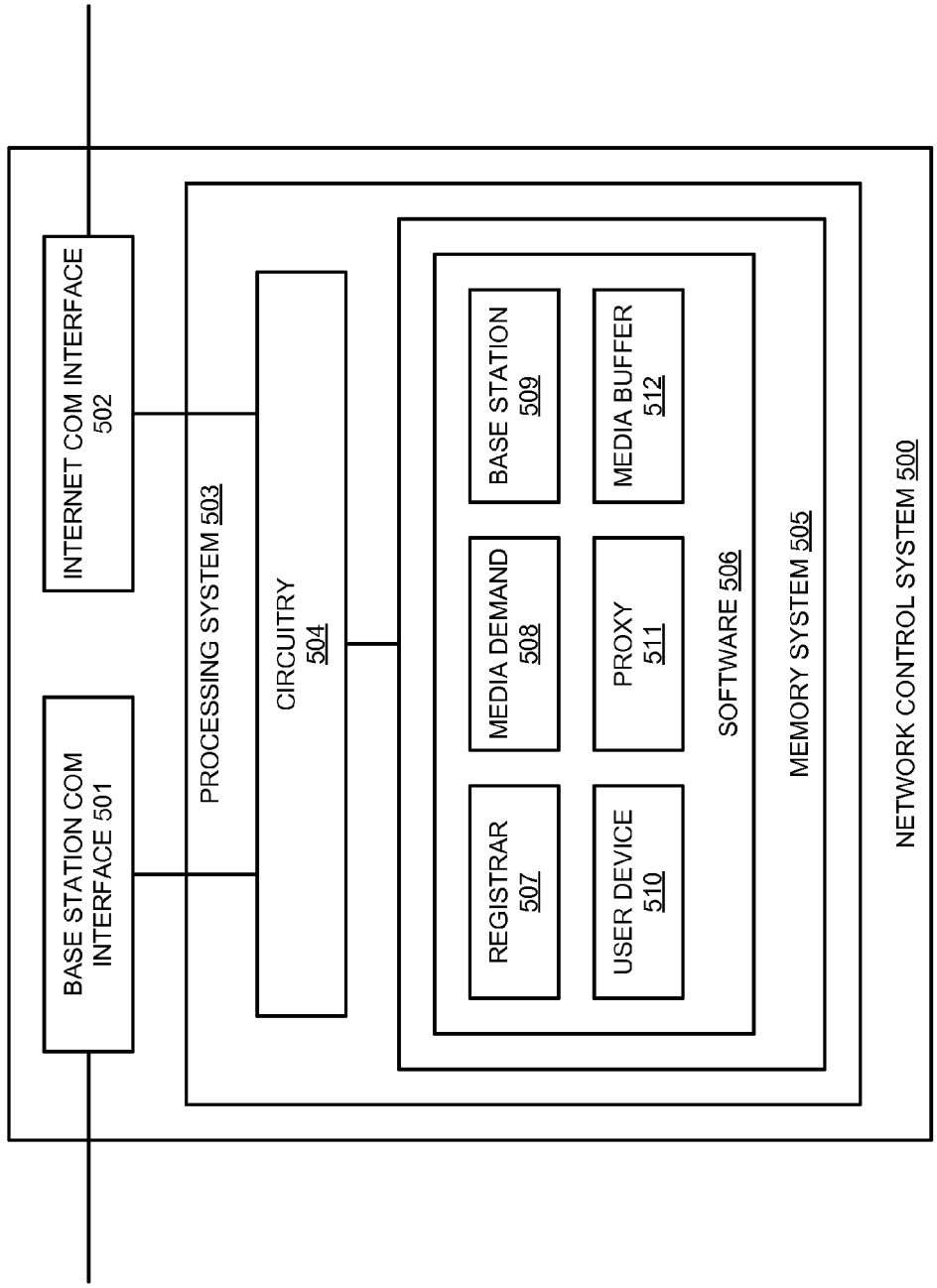
FIG. 5 illustrates a network control system to direct FM broadcasting from individual base stations.

FIG. 5 illustrates network control system 500 to direct demand-based FM broadcasting from individual base stations. Network control system 500 provides an example of the network control systems described above, although those systems could use alternative configurations. Network control system 500 comprises base station communication interface 501, Internet communication interface 502, and processing system 503. Processing system 503 is linked to communication interfaces 501-502. Processing system 503 includes processing circuitry 504 and memory device 505 that stores operating software 506. Operating software 506 comprises software modules 507-512. Network control system 500 may include other well-known components such as a power supply and enclosure that are not shown for clarity.

Communication interfaces 501-502 comprise communication circuitry and software for network communications. Communication interfaces 501-502 may use various protocols, such as TDM, Ethernet, IP, SONET, and the like. Base station communication interface 501 receives user media requests and exchanges notifications with base stations and user devices. Base station communication interface 501 also transfer media streams to base stations for FM broadcasts. Internet communication interface 502 receives event registrations, media streams, and also exchanges proxy messaging with content servers.

Processing circuitry 504 comprises microprocessor and other circuitry that retrieves and executes operating software 506 from memory device 505. Memory device 505 comprises a non-transitory storage medium, such as a disk drive, flash drive, data storage circuitry, or some other memory apparatus. Processing circuitry 504 is typically mounted on a circuit board that may also hold memory device 505 and portions of communication interfaces 501-502. Operating software 506 comprises computer programs, firmware, or some other form of machine-readable processing instructions. Operating software 506 may include utilities, drivers, network interfaces, applications, or some other type of software. In this example, operating software 506 comprises software modules 507-512, although software 506 could have alternative configurations in some examples.

When executed by processing circuitry 504, registrar module 507 directs processing system 502 to accept and mange live event registrations. When executed by processing circuitry 504, media demand module 508 directs processing system 502 to process user media requests and registrations to assess media demand and select media streams for individual base stations. When executed by processing circuitry 504, base station module 509 directs processing system 502 to instruct individual base stations to broadcast selected media over FM/VHF channels. When executed by processing circuitry 504, user device module 510 directs processing system 502 to notify the appropriate user devices of the FM broadcasts and to receive broadcast consumption messages from the user devices. When executed by processing circuitry 504, proxy module 511 directs processing system 502 to interact with the content servers on behalf of the user devices. When executed by processing circuitry 504, media buffer module 512 directs processing system 502 to store and distribute selected media streams to the appropriate base stations.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system to broadcast using Frequency Modulation (FM) in a Very High Frequency (VHF) band, the method comprising:
   in a first base station system, wirelessly exchanging first wireless communications with a first plurality of user devices wherein the first wireless communications comprise first user media requests for a first live event and a first media stream for the first live event;
   in a second base station system, wirelessly exchanging second wireless communications with a second plurality of user devices wherein the second wireless communications comprise second user media requests for a second live event and a second media stream for the second live event;
   in a control system, processing the first user media requests to determine that demand for the first live event exceeds a first threshold, and in response, to identify the first user devices that requested the first live event to the first base station system and processing the second user media requests to determine that demand for the second live event exceeds a second threshold, and in response, to identify the second user devices that requested the second live event to the second base station system;
   in the first base station system, wirelessly broadcasting the first media stream for the first live event using FM in the VHF band and wirelessly notifying at least some of the first user devices that requested the first live event of the first media stream FM broadcast responsive to the control system; and
   in the second base station system, wirelessly broadcasting the second media stream for the second live event using FM in the VHF band and wirelessly notifying at least some of the second user devices that requested the second live event of the second media stream FM broadcast responsive to the control system.

2. The method of claim 1 further comprising, in the control system, receiving a first live event registration indicating a first Uniform Resource Locator (URL) and a second live event registration indicating a second URL, and wherein processing the first user media requests comprises identifying the first URL in some of the first user media requests and wherein processing the second user media requests comprises identifying the second URL in some of the second user media requests.

3. The method of claim 1 further comprising, in the control system, receiving the first media stream and transferring the first media stream to the first base station system with instructions to wirelessly broadcast the first media stream using FM in the VHF band, and receiving the second media stream and transferring the second media stream to the second base station system with instructions to wirelessly broadcast the second media stream using FM in the VHF band.

4. The method of claim 1 further comprising, in the control system, determining the first user devices that consume the first media stream FM broadcast and providing a proxy to a first content server for the first user devices that consume the first media stream FM broadcast, and determining the second user devices that consume the second media stream FM broadcast and providing the proxy to a second content server for the second user devices that consume the second media stream FM broadcast.

5. The method of claim 4 wherein providing the proxy to the first content server comprises transferring first consumption messages on behalf of the first user devices that consume the first media stream FM broadcast and wherein providing the proxy to the second content server comprises transferring second consumption messages on behalf of the second user devices that consume the second media stream FM broadcast.

6. The method of claim 4 wherein determining the first user devices that consume the first media stream FM broadcast comprises receiving first notification messages from the first user devices that consume the first media stream FM broadcast, and wherein determining the second user devices that consume the second media stream FM broadcast comprises receiving second notification messages from the second user devices that consume the second media stream FM broadcast.

7. The method of claim 1 wherein the first user devices and the second user devices comprise wireless telephones with FM/VHF receivers.

8. A wireless communication system to broadcast using Frequency Modulation (FM) in a Very High Frequency (VHF) band, the method comprising:
   a first base station system configured to wirelessly exchange first wireless communications with a first plurality of user devices wherein the first wireless communications comprise first user media requests for a first live event and a first media stream for the first live event;

a second base station system configured to wirelessly exchange second wireless communications with a second plurality of user devices wherein the second wireless communications comprise second user media requests for a second live event and a second media stream for the second live event;

a control system configured to process the first user media requests to determine that demand for the first live event exceeds a first threshold, and in response, to identify the first user devices that requested the first live event to the first base station system and process the second user media requests to determine that demand for the second live event exceeds a second threshold, and in response, to identify the second user devices that requested the second live event to the second base station system;

the first base station system configured to wirelessly broadcast the first media stream for the first live event using FM in the VHF band and wirelessly notify at least some of the first user devices that requested the first live event of the first media stream FM broadcast responsive to the control system; and the second base station system configured to wirelessly broadcast the second media stream for the second live event using FM in the VHF band and wirelessly notify at least some of the second user devices that requested the second live event of the second media stream FM broadcast responsive to the control system.

9. The wireless communication system of claim 8 wherein the control system is configured to receive a first live event registration indicating a first Uniform Resource Locator (URL) and a second live event registration indicating a second URL, identify the first URL in some of the first user media requests, and identify the second URL in some of the second user media requests.

10. The wireless communication system of claim 8 wherein the control system is configured to receive the first media stream and transfer the first media stream to the first base station system with instructions to wirelessly broadcast the first media stream using FM in the VHF band, and receive the second media stream and transfer the second media stream to the second base station system with instructions to wirelessly broadcast the second media stream using FM in the VHF band.

11. The wireless communication system of claim 8 wherein the control system is configured to determine the first user devices that consume the first media stream FM broadcast and provide a proxy to a first content server for the first user devices that consume the first media stream FM broadcast, and determine the second user devices that consume the second media stream FM broadcast and provide the proxy to a second content server for the second user devices that consume the second media stream FM broadcast.

12. The wireless communication system of claim 11 wherein the control system is configured to transfer first consumption messages on behalf of the first user devices that consume the first media stream FM broadcast and transfer second consumption messages on behalf of the second user devices that consume the second media stream FM broadcast.

13. The wireless communication system of claim 11 wherein the control system is configured to process receive first notification messages from the first user devices that consume the first media stream FM broadcast, and to receive second notification messages from the second user devices that consume the second media stream FM broadcast.

14. The wireless communication system of claim 8 wherein the first user devices and the second user devices comprise wireless telephones with FM/VHF receivers.

* * * * *